March 21, 1961 S. N. JOHNSON 2,975,511
METHOD OF MAKING TAPERED WHEEL DISKS
Filed Nov. 15, 1957 4 Sheets-Sheet 1
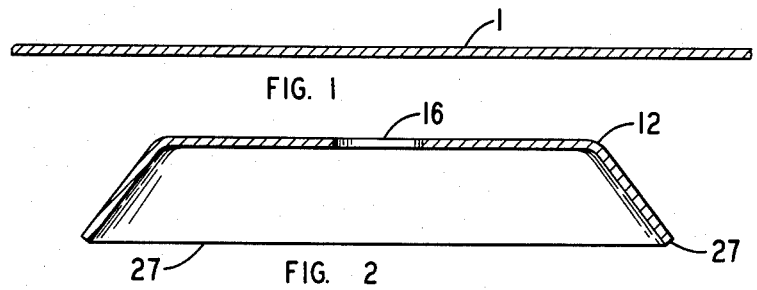
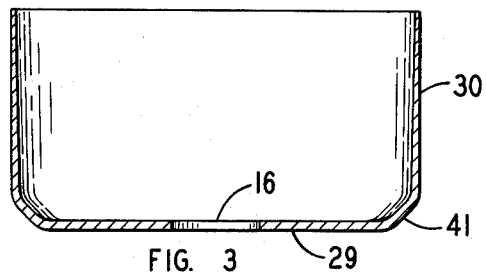
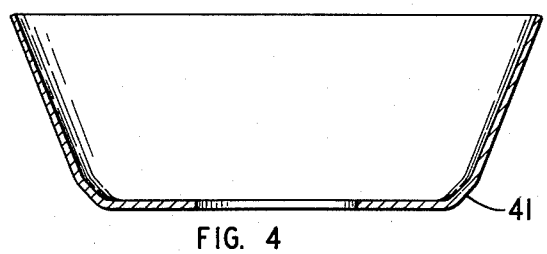
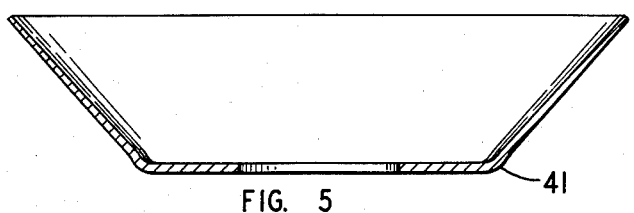
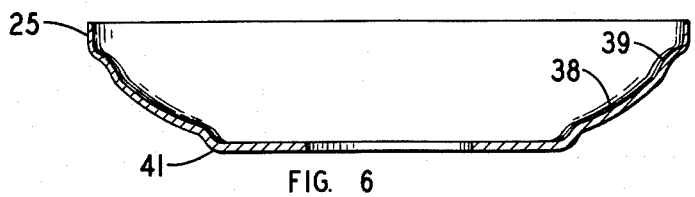
INVENTOR.
STANLEY N. JOHNSON
BY
ATTORNEYS March 21, 1961  S. N. JOHNSON  2,975,511
METHOD OF MAKING TAPERED WHEEL DISKS
Filed Nov. 15, 1957  4 Sheets-Sheet 2

INVENTOR.
STANLEY N. JOHNSON
BY
Barnes, Kisselle,
Raisch & Choate
ATTORNEYS.

March 21, 1961  S. N. JOHNSON  2,975,511
METHOD OF MAKING TAPERED WHEEL DISKS
Filed Nov. 15, 1957  4 Sheets-Sheet 3

INVENTOR.
STANLEY N. JOHNSON
BY
*Barnes, Kisselle, Raisch & Choate*
ATTORNEYS

March 21, 1961  S. N. JOHNSON  2,975,511
METHOD OF MAKING TAPERED WHEEL DISKS
Filed Nov. 15, 1957  4 Sheets-Sheet 4

INVENTOR
STANLEY N. JOHNSON
BY
Barnes, Kisselle, Raisch & Choate
Attorneys 2,975,511
Patented Mar. 21, 1961

2,975,511

METHOD OF MAKING TAPERED WHEEL DISKS

Stanley N. Johnson, Lansing, Mich., assignor to Motor Wheel Corporation, Lansing, Mich., a corporation of Michigan Filed Nov. 15, 1957, Ser. No. 696,769

6 Claims. (Cl. 29—159.01)

This invention relates to a method of making tapered wheel disks and more particularly to a method of stamping a tapered vehicle wheel disk.

The invention contemplates a method of stamping a tapered metal vehicle wheel disk to its finished form by a stamping method which produces strong finished wheel disks more expeditiously and more economically than the methods now in use. The present process can be, and has been, used successfully in making vehicle wheels using steel of all the different commercial grades now commonly used in the manufacture of automotive vehicle, trailer, and farm implement wheels.

Fig. 1 shows in cross-section a portion of a flat sheet of material out of which the wheel body blank is sheared.

Fig. 2 is a sectional view of the round blank which is sheared, formed or dished, and punched in the first operation.

Figs. 3, 4, 5 and 6 show the shape of the blank after each of four succeeding forming or stamping operations.

Referring more particularly to the drawings there is shown in Fig. 1 a flat sheet 1 of material such as steel or any other metal or alloy suitable for forming vehicle wheel bodies. Sheet 1 is of substantially uniform thickness throughout its entire area.

Figure 7:
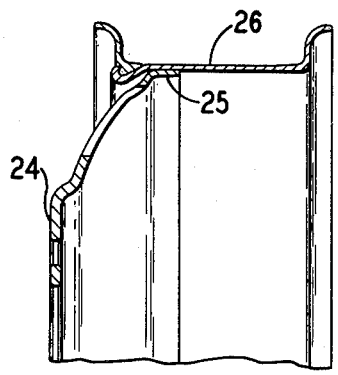
Fig. 7 is a fragmentary section showing the finished disk mounted in, and secured to, a rim to form a wheel.
Figure 8:
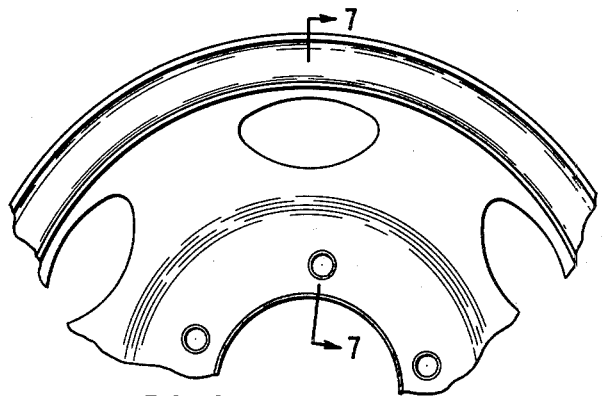
Fig. 8 is a fragmentary side elevation of the finished wheel shown in Fig. 7.
Figure 9:
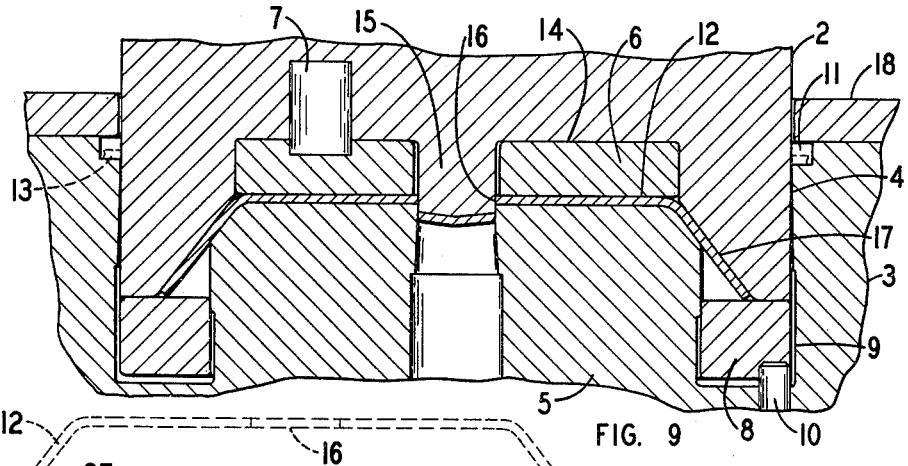
Figs. 9, 10, 11, 12 and 13 are cross-sectional views through the male and female die members and the metal blank illustrating the five steps of the method performed on the metal blank to form respectively the blanks shown in Figs. 2, 3, 4, 5 and 6.

Referring to Fig. 9, there is shown a punch 2, a female shearing die 3 having an opening 4 into which the punch 2 descends. The forming die is designated 5 and may, if desired, be formed integrally with die 3. Pressure plate 6 is carried or floated within a recess in punch 2 by a plurality of springs 7. Ring 8 is floated or elastically supported within circular die cavity 9 by means of a plurality of rods 10, the lower ends of which are connected to pistons within pneumatic or hydraulic cylinders (not shown). The flat sheet 1 is slid through opening 11 into the die while punch 2 is retracted.

As the punch descends, circular or round blank 12 is sheared from sheet 1 by the coaction of punch 2 and shearing die 3 leaving the flash 13 at the entrance of die 3. As the punch 2 continues to descend below the entrance to die opening 9, pressure plate 6, which is projected downwardly below the bottom 14 of the cavity in the lower end of punch 2 and supported by spring 7, holds blank 12 against the top of forming die 5. Punch projection 15 acts as a pilot for pressure plate 6. As the punch 2 descends further, springs 7 are compressed and punch portion 15 shears hole 16 out of blank 12 and the conical cavity 17 in the bottom of the punch 2 cooperates with forming die 5 to form blank 12 into a concave or dish form.

As punch 2 is retracted out of die 3, ring 8 is moved upwardly by the elastic or pneumatically actuated rods 10 to thereby carry blank 12 to the top of the die. Strippers 18 strip the flash 13 from the punch 2. The dished blank is shown in Fig. 2.

Figure 10:
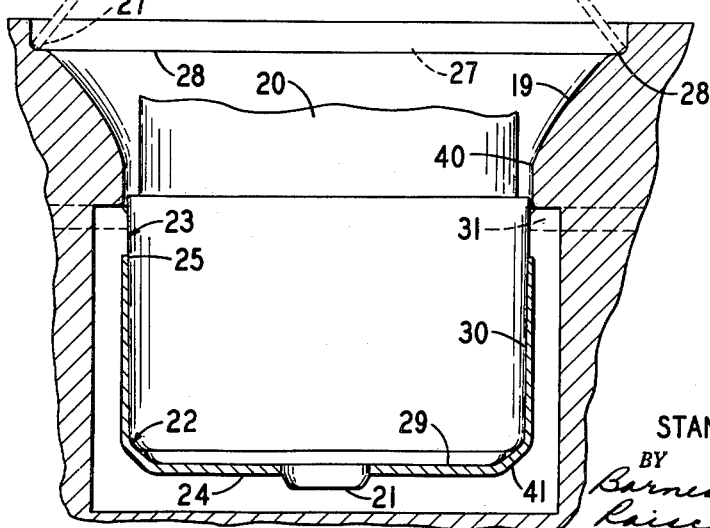

Dish blank 12 is now positioned in the press, a portion of which is shown in Fig. 10. In Fig. 10, there is illustrated a female die 19 and a male die 20 provided with a pilot 21. Die 20 is uniformly tapered inwardly toward its pilot end so that the die 20 has its smallest diameter at the circumferential area indicated at 22 and its greatest diameter at the circumferenial area indicated at 23. This taper will vary, of course, with the size of the wheel. The amount of taper from the central bolting-on flange portion 24 of the wheel to the circumferential edge portion 25, which is riveted, welded or otherwise secured to the rim 26, will conform to the conventional taper followed in the current manufacture of wheel bodies by rolling and forging. By way of example, the bolting-on flange portion 24 of the wheel can have a thickness of $5/16$ of an inch and the disk will be tapered down to a thickness of about $2/16$ of an inch at the circumferential edge portion 25.

In performing the second operation of the present process (at this time punch 20 is withdrawn from die 19), dished blank 12 is centered in die 19, as shown in the dotted lines, Fig. 10, with the concave side of the blank facing downwardly or into the die 19 and with the circumferential edge 27 confined in the groove or shoulder 28. As the punch 20 descends, the periphery or circumferential edge 27 of blank 12 cannot expand and punch 20 first literally turns dished blank 12 inside out and then draws the blank 12 through die 19 to form it into a drum having a bottom wall 29 of substantially uniform thickness and a tapered side wall 30. The groove or shoulder 28 has a radius in the corner and as the blank is pushed downwardly, the corners of the blank rub against this radius which smooths the corners of the blank, removing any burrs or roughness. This drum is shown in Fig. 3. The wall 30 is slightly coned because the male die or punch 20 is tapered and coacts with the cylindrical die opening 40 in die 19 to taper the side wall 30 as the blank is drawn through the die 19 by punch 20. As punch 20 is withdrawn, strippers 31 strip the drum or blank from the punch. It is necessary to confine the periphery 27 of blank 12 as above described in order to turn the dished blank 12 inside out without enlarging the periphery 27. By turning the dished blank 12 inside out, undesirable stretching or thinning out of the metal in the lower circumferential corner of the blank, indicated at 41, is avoided and only the side wall 30 of the blank is tapered as punch 20 draws the blank through the die opening 40.

Since the drum 29, 30, resulting from the second operation step, Fig. 10, is very hard or work hardened by the cold working of the metal, therefore the drum 29, 30 is heated to its critical range or about red heat (about 1500° F.), that is, a temperature at which it becomes plastic, before the drum is placed in the female die 32 and acted upon by the punch 33 to flare the cylindrical wall 30 of the drum outwardly, as shown in Fig. 4. This heating of the drum to its critical range removes the cold work hardening. In the step illustrated in Fig. 11, wherein the side wall of the drum is flared to cone shape, the punch 33 contacts the whole inside surface of the drum but the female die 32 confines only the lower part of the drum.

While still hot, the drum 29, 30 is transferred to the female die 34 and acted upon by conical punch 35 to press it to the shape shown in Fig. 5. In the second flaring operation, shown in Fig. 12, the punch 35 contacts the whole inside surface of the drum and the female die 34 contacts the whole outside surface of the drum. By suitable die arrangement, the hot pressing here described as being done in two operations can be done in a single operation.

Figure 12:
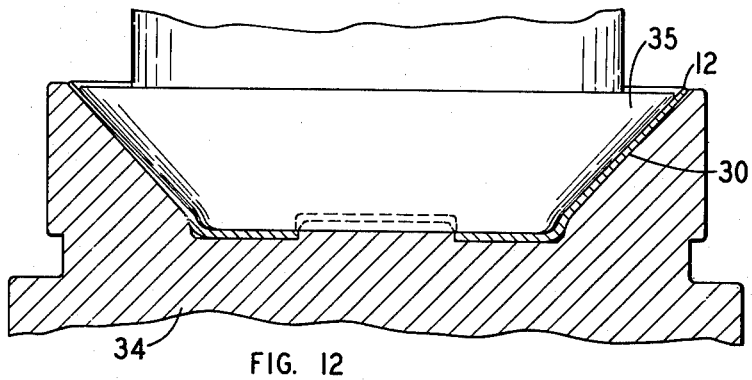
Figure 13:
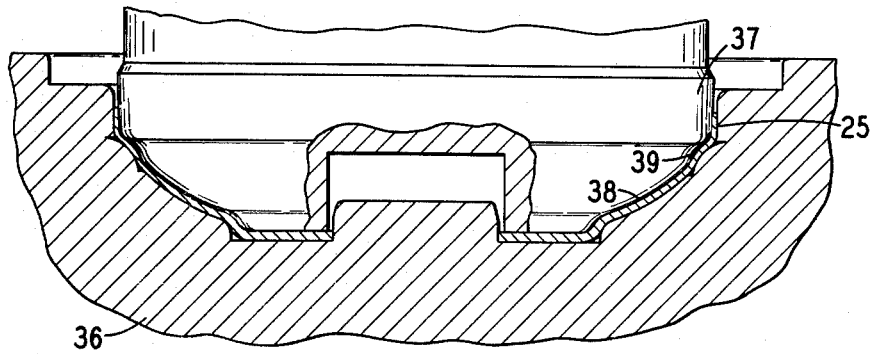

The final step in the forming of the drum is illustrated in Fig. 13 and this step is preferably performed cold so that the drum is cold worked during the final step which improves the strength or physical properties of the drum but this step may be performed hot. In the final step, illustrated in Fig. 13, the blank shown in Figs. 5 and 12 is positioned on female die 36 and pressed by punch 37 into its final shape, as shown in Figs. 13 and 6. During the final drawing operation, the outer circumferential edge portion 25 of the drum is bent inwardly to form a cylindrical portion for attachment to the wheel rim 26 and the portion between the bolting-on flange 24 and the circumferential portion 25 is given a reverse curve 38, 39, as shown in Figs. 6 and 13.

Figure 11:
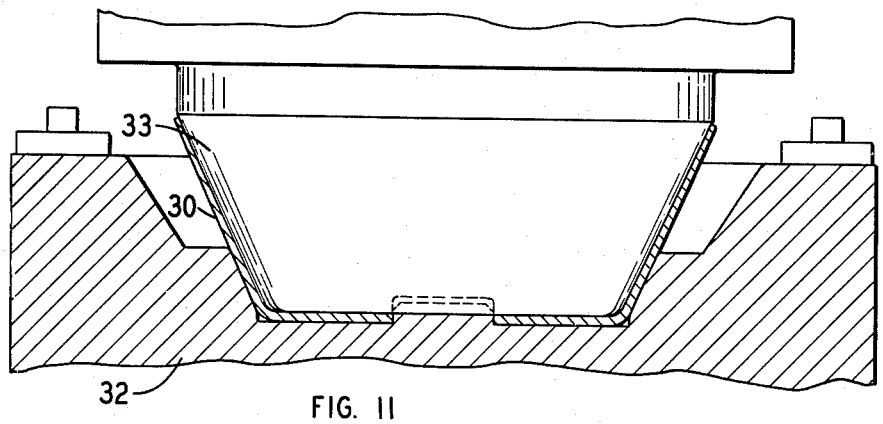

Preferably, the steps illustrated in Figs. 11 and 12 are performed in rapid succession so that only one heating of the stamping is necessary, but it will be appreciated that a blank can be heated for each of the steps illustrated in Figs. 11 and 12.

Figure 14:
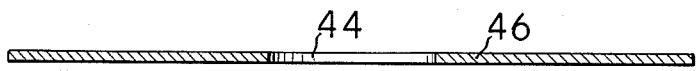
Fig. 14 shows a cross section of a round metal blank of uniform thickness on which the first method step may be performed.
Figure 15:
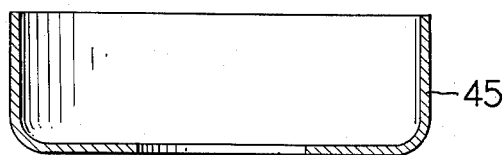
Fig. 15 shows a cupped blank of uniform thickness which can be used instead of the flat blank of Fig. 14.

In some cases, the operation illustrated in Fig. 2 may be omitted and the original blank may be formed directly into the drum illustrated in Fig. 3. In such case, the starting blank may be in the form of a circular blank 46 (Fig. 14) or the metal cup or cylinder 45 (Fig. 15). Blank 46 is of substantially uniform thickness throughout its entire area and is provided with a central aperture 44. Cup 45 likewise has a central aperture 47 and has a substantially uniform wall thickness. When the method of the present invention is practiced without the step shown in Fig. 2, it can start with either cup 45 or flat blank 46. Cup 45 can be stamped or pressed from a blank such as 46. Blank 46 and cup 45 can be made of a relatively ductile metal suitable for the fabrication of vehicle wheels, but preferably will be made of any of the commercial grades of low-carbon steel now commonly used in the manufacture of automotive wheels.

Figure 16:
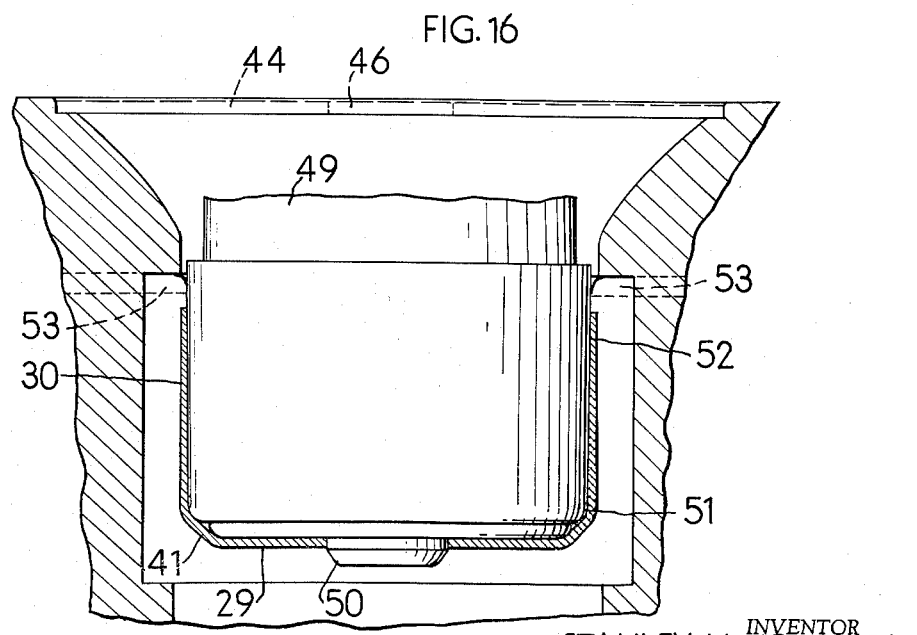
Fig. 16 is a cross-sectional view through the male and female die members and the metal blank illustrating the manner in which the blank of Fig. 14 is formed into the drum of Fig. 3.

Referring to Fig. 16, there is illustrated a female die 48 and a male die 49 provided with a pilot 50. Die 49 is uniformly tapered inwardly toward its pilot end so that the die has its smallest diameter at the circumferential area indicated at 51 and its greatest diameter at the circumferential area indicated at 52. This taper, of course, will vary with the size of the wheel.

In forming the blank 46 directly into the drum shown in Fig. 3, the blank 46 is centered on the die 48 as shown in the dotted lines (Fig. 16); and the male die 49 moves downwardly and draws the blank 46 through the die 48 to form it into the drum illustrated in Fig. 3 having the bottom wall 29 of substantially uniform thickness and the tapered side wall 30. As the punch 49 is withdrawn, the strippers 53 strip the drum or blank from the punch when the cup 45 is used in place of blank 46. Then, as punch 49 draws cup 45 through die 48, the cup 45 is pressed or drawn into the same identical shape as the drum illustrated in Figs. 3 and 16.

It will be observed that the bottom wall 29 forms the bolting-on flange of the wheel disk and that this bottom wall is formed in the operation illustrated in either Fig. 10 or Fig. 16 and is not thereafter worked. Thus, it is maintained flat and of substantially uniform thickness throughout the forming of the wheel disk. The present method therefore enables the manufacture of tapered wheel disks with a bolting-on flange of almost any size to accommodate practically any hub mounting. It also enables working with blanks of fairly wide range in thickness limited only by press capacity. It permits a large variety of combinations of center flange thickness and side wall thickness. For example, it is possible by the present method to work down a comparatively thick blank to a relatively thin side wall by a series of draw-taper operations of the type illustrated in Fig. 16 without changing the thickness of the bottom wall of the blank which forms the bolting-on flange of the wheel disk.

It is evident from the above that the present process for stamping a tapered disk vehicle wheel is simple, economical, and lends itself to the expeditious production of tapered wheel disks or bodies.

In the process described in this application, the metal is moved in a direction at right angles to the plane of the original disk 1 or 46; and after the tapering operation is finished (Fig. 10 or Fig. 16), the periphery of the disk or blank is smaller than the periphery of the original disk or blank.

This application is a continuation-in-part of my applications Serial No. 267,813, filed January 23, 1952, now abandoned, and Serial No. 462,457, filed October 15, 1954, now abandoned, each of said applications being a continuation-in-part of my applications Serial No. 180,270, filed August 18, 1950, now abandoned.

I claim:
1. The method of making a tapered vehicle wheel disk comprising forming a flat circular blank from sheet steel of substantially uniform gauge, selecting a central circular portion of said blank to form the bolting-on flange of the wheel disk, maintaining said central circular portion flat and to the diameter of the bolting-on flange of the finished wheel disk while working substantially the entire annular portion of the disk that surrounds and extends radially outwardly from said central portion into the outer circumferential portion of the wheel disk, said working of said annular portion comprising the steps of forming by drawing said annular portion into a wall having a cylindrical outer surface and an inner surface which tapers outwardly in a direction away from said central portion and which extends substantially perpendicular to the plane of said central portion and an annular corner portion which extends circumferentially around the periphery of said central portion and connects the inner edge of said wall with the periphery of said central portion, thereafter flaring said tapered cylindrical wall outwardly from the periphery of said central portion substantially throughout a major portion of its axial extent into conical shape, and thereafter pressing the conical side wall into its finished form.

2. The method called for in claim 1 wherein said flaring of the cylindrical wall is performed in at least two successive steps, the obtuse angle between the plane of the bottom wall and the plane of the side wall increasing by increments with each successive flaring step.

3. The method of making a tapered vehicle wheel disk comprising forming a flat circular blank from sheet steel of substantially uniform gauge, selecting a central circular portion of said blank to form the bolting-on flange of the wheel disk, maintaining said central portion substantially flat, the thickness thereof substantially the same as the substantially uniform thickness of the blank and the diameter thereof corresponding substantially to the diameter of the bolting-on flange of the finished wheel disk while working substantially the entire annular portion of the disk that surrounds and extends radially outwardly from said central portion into the outer circumferential portion of the wheel disk, said working of said annular portion comprising the steps of forming by drawing said annular portion into a cylindrical wall and an annular corner portion connecting the cylindrical wall with the outer periphery of said portion, the cylindrical wall being tapered in thickness, being progressively thinner in the direction of the free edge thereof, and extending substantially perpendicular to the plane of said central portion, thereafter flaring said tapered cylindrical wall outwardly from the annular portion substantially throughout a major portion of its axial extent into generally straight conical shape, and thereafter pressing the generally straight conical side wall into its finished form.

4. The method of making tapered vehicle wheel disks comprising the steps of stamping a substantially flat, round blank of substantially uniform thickness into the form of a hollow dish having a flat bottom and an outwardly flared side wall, confining the circumferential edge portion only of the dish while turning the dish inside out, then drawing said dish into a drum having a bottom wall forming a bolting-on flange portion and a cylindrical side wall of tapered cross-section having a diameter corresponding generally to the diameter of the bottom of the original dished blank, thereafter flaring the tapered cylindrical side wall progressively outwardly and upwardly from the periphery of said bottom wall into a cone, and thereafter pressing the conical side wall to form the circumferential edge portion into a cylinder coaxial with the bolting-on flange.

5. The method of making tapered vehicle wheel disks comprising the steps of stamping a substantially flat, round blank of substantially uniform thickness into the form of a hollow dish having a flat, circular bottom and an outwardly flared side wall, confining the circumferential edge portion only of the dish while turning the dish inside out, drawing the side wall of the dish into a cylinder having a substantially uniform tapered cross-section with the inner surface of the side wall forming a cone and the outer surface of the side wall forming a cylinder having a diameter generally corresponding to the diameter of the flat, circular bottom of the dished blank, the side wall of the inverted dished blank being drawn such that the side wall of the cylinder has its greatest thickness adjacent the bottom of the blank and its least thickness remote from the bottom, heating the blank and while thus heated flaring the side wall of the blank outwardly while confining the inner portion of said side wall adjacent the bottom wall of the blank, thereafter further flaring the side wall of the blank by the substantially uniform application of pressure to the inner surface of said side wall in an axial direction while holding the base of the blank stationary, said steps of flaring serving to progressively increase the diameter of the side wall throughout its extent, and thereafter cold forming the outer circumferential edge portion of the side wall of the blank by drawing the same radially inwardly to form a cylinder.

6. The method of making a tapered vehicle wheel disk comprising the steps of stamping a substantially flat, round blank of substantially uniform thickness into the form of a hollow dish having a flat, circular base and an outwardly flared frusto-conical side wall, confining the circumferential edge portion only of the side wall of the dish while turning the dish inside out, then cold drawing the side wall of the dished blank into a tapered cylinder, the axis of which is perpendicular to the undrawn central portion of the blank to thereby form a drum with a tapered side wall having a diameter generally corresponding to the diameter of the base of the original dished blank, heating the drum blank and while heated flaring the tapered side wall of the drum outwardly into a cone having a straight side wall by the application of axial pressure having a radial component to the inner surface of the side wall of the drum while circumferentially confining the portion of the side wall adjacent the bottom, and while heated thereafter further flaring the side wall of the cone throughout its extent by the further application of axial pressure having a radial component to the inner surface of the side wall of the cone.

References Cited in the file of this patent

UNITED STATES PATENTS

| | | |
|---|---|---|
| 501,547 | Thomson | July 18, 1893 |
| 671,427 | Anderson | Apr. 9, 1901 |
| 1,649,841 | May | Nov. 22, 1927 |
| 1,651,111 | Winter | Nov. 29, 1927 |
| 1,925,823 | Singer | Sept. 5, 1933 |
| 2,120,595 | Ash | June 14, 1938 |
| 2,124,923 | Le Jeune | July 26, 1938 |
| 2,170,661 | Le Jeune | Aug. 22, 1939 |
| 2,178,143 | Le Jeune | Oct. 31, 1939 |
| 2,220,652 | Irmann | Nov. 5, 1940 |
| 2,301,565 | Moore | Nov. 10, 1942 |
| 2,349,738 | Le Jeune | May 23, 1944 |
| 2,406,062 | Cornell | Aug. 20, 1946 |
| 2,518,483 | Mapes | Aug. 15, 1950 |

FOREIGN PATENTS

| | | |
|---|---|---|
| 284,545 | Great Britain | Feb. 2, 1928 |